Sept. 30, 1952            H. G. NISSEN            2,612,304
DRINK DISPENSING APPARATUS FOR CARBONATED BEVERAGES
Filed March 13, 1946            5 Sheets-Sheet 3
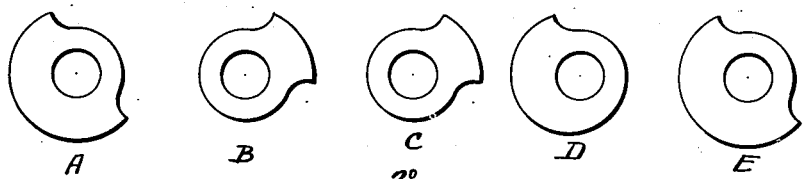
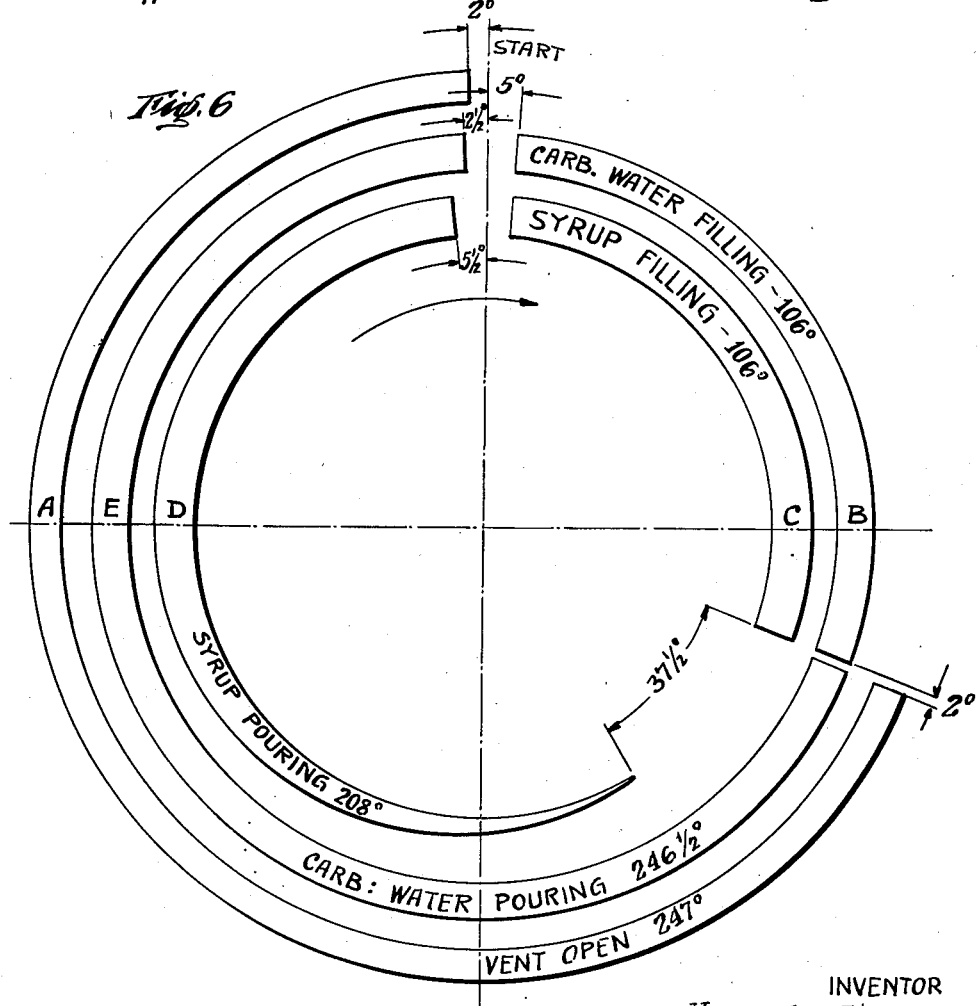
INVENTOR
Hans G. Nissen
BY
ATTORNEY Sept. 30, 1952 H. G. NISSEN 2,612,304
DRINK DISPENSING APPARATUS FOR CARBONATED BEVERAGES
Filed March 13, 1946 5 Sheets-Sheet 4
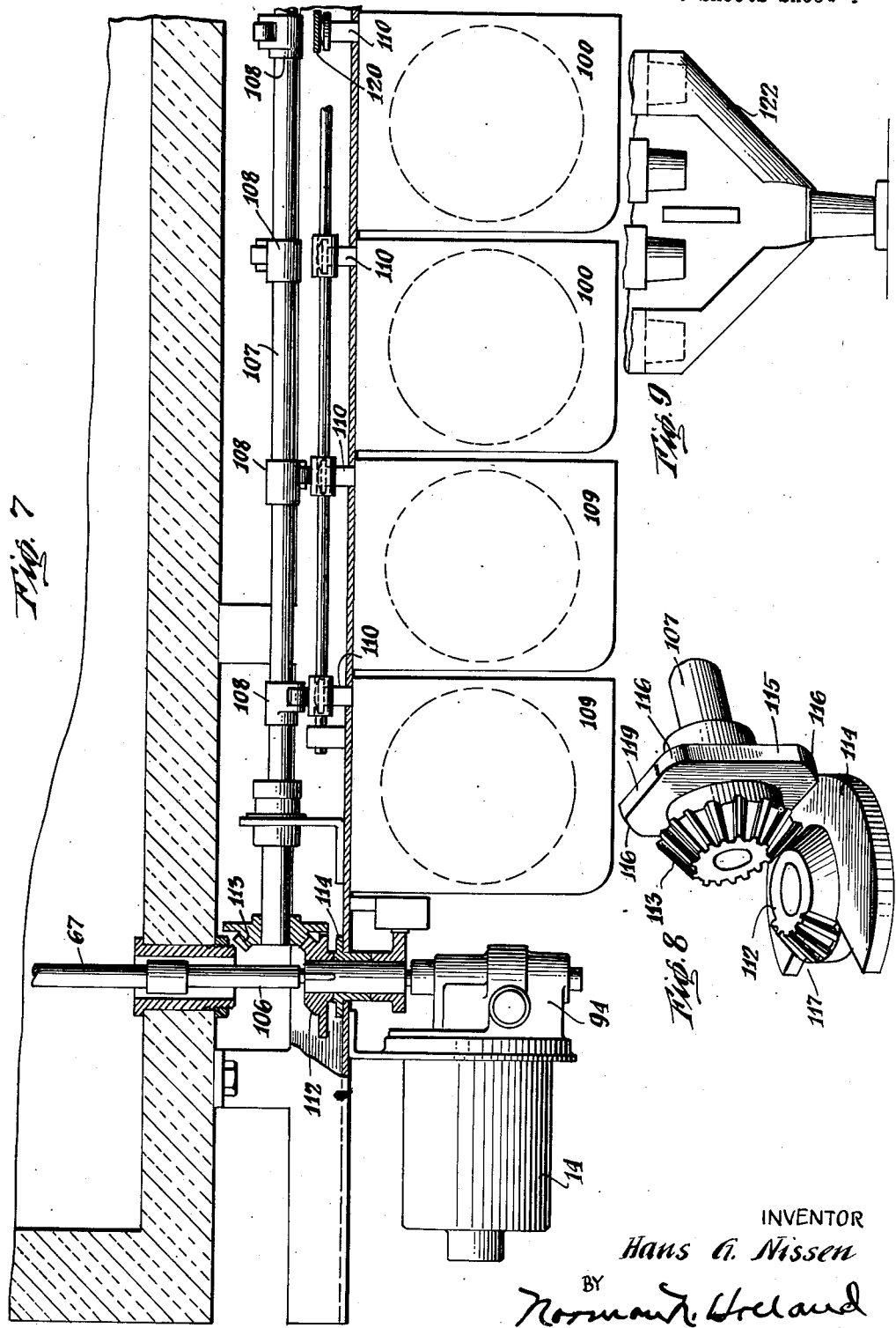
INVENTOR
Hans G. Nissen
BY
Norman R. Holland
ATTORNEY

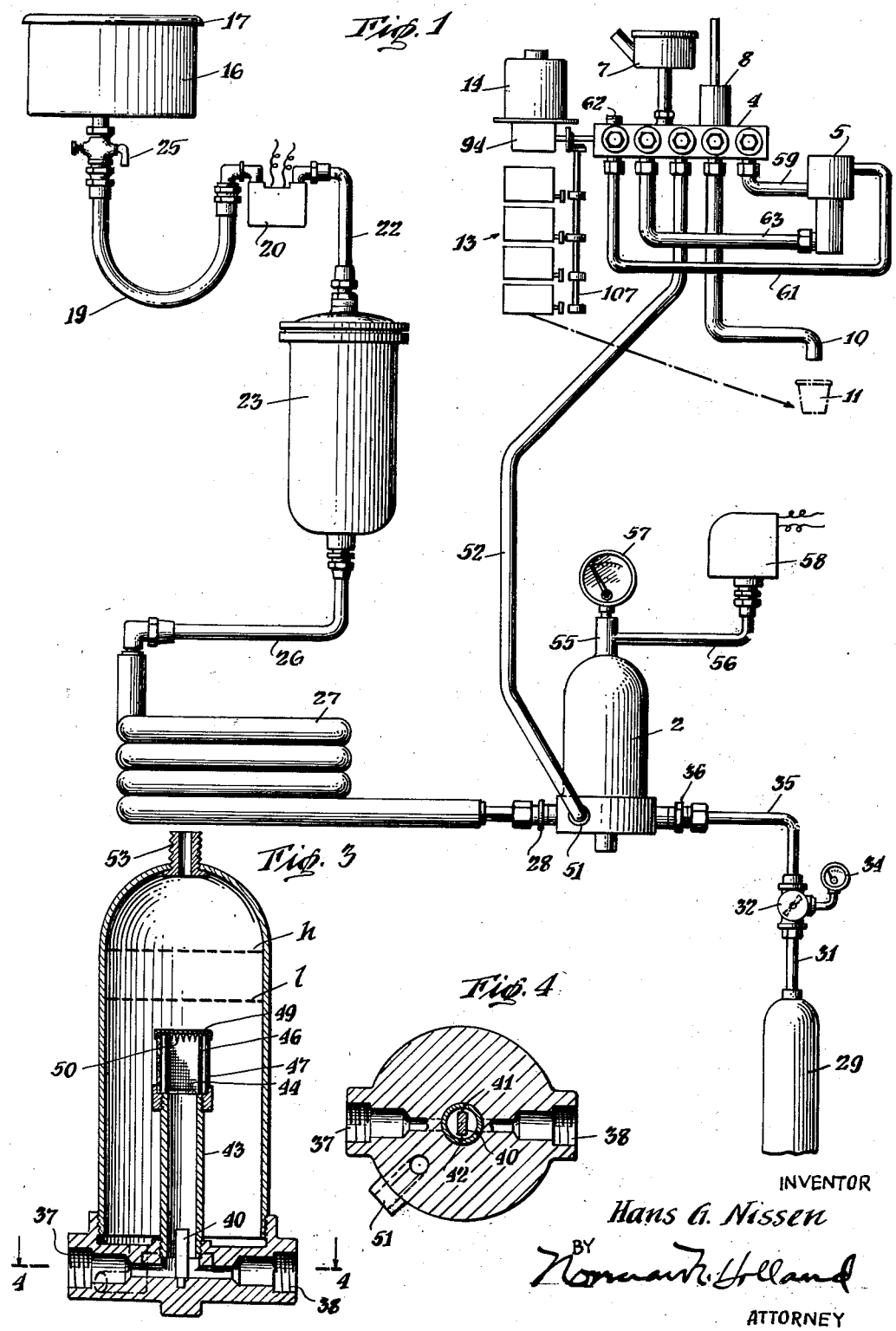

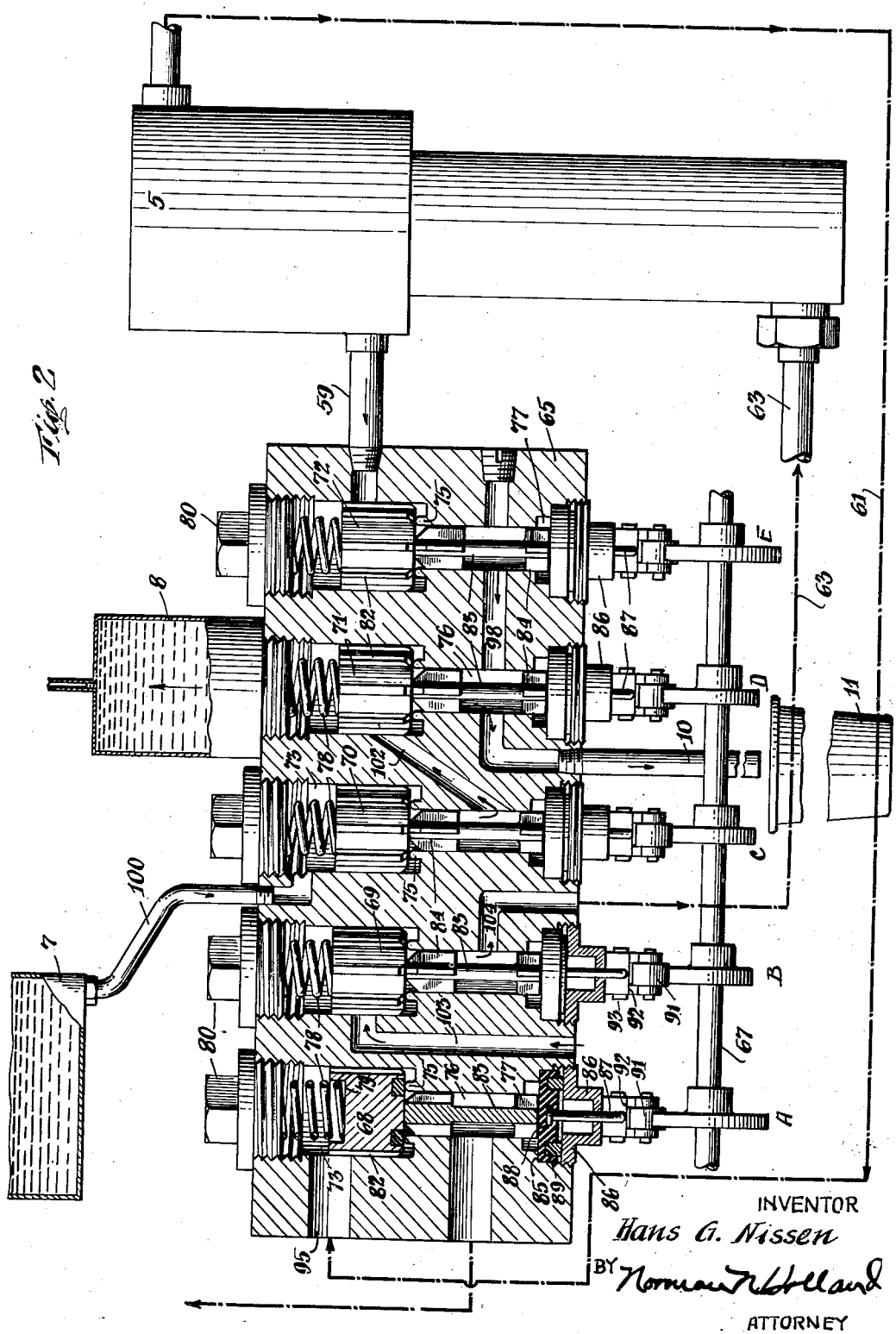

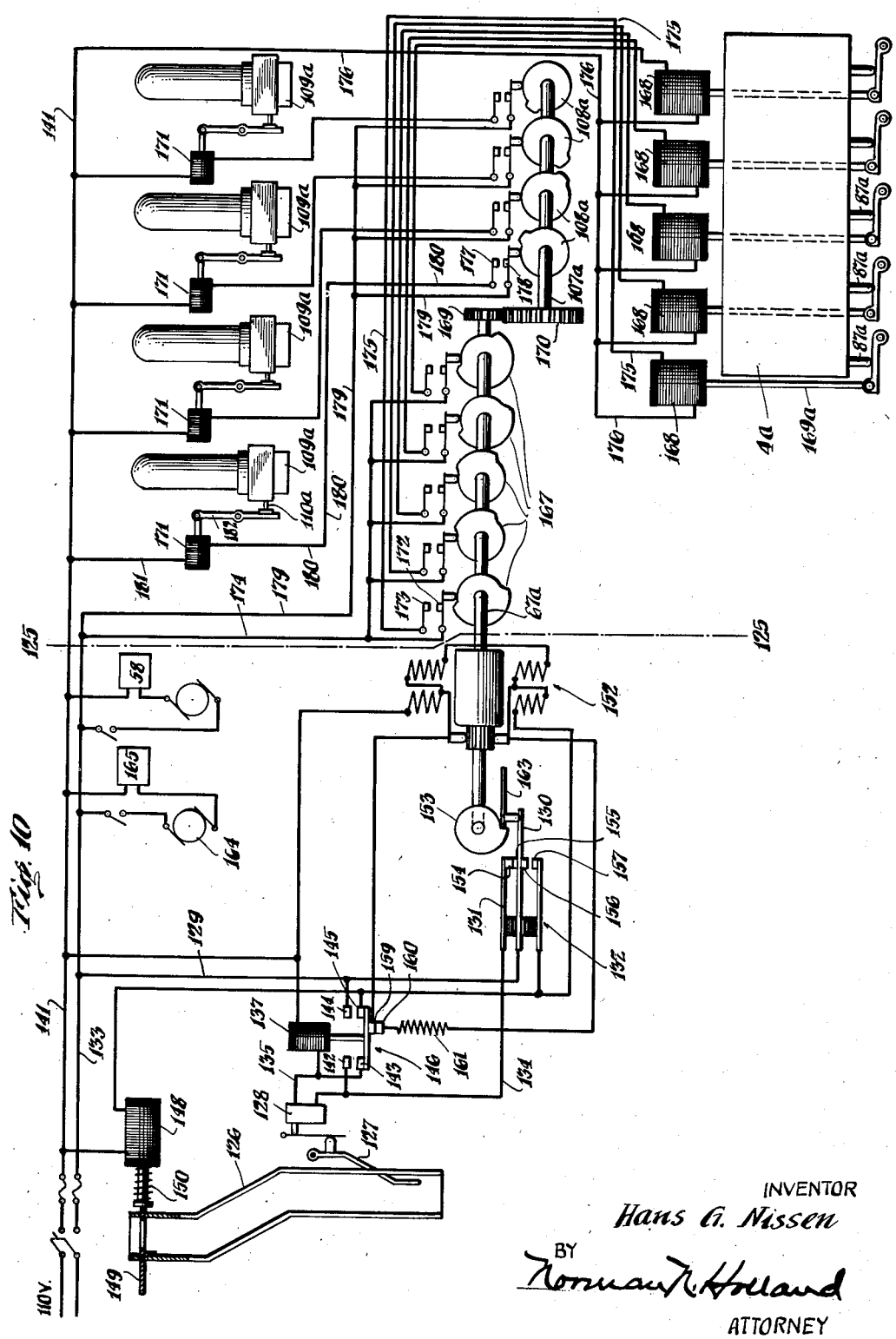

Patented Sept. 30, 1952

2,612,304

UNITED STATES PATENT OFFICE 2,612,304

DRINK DISPENSING APPARATUS FOR CARBONATED BEVERAGES

Hans G. Nissen, New York, N. Y., assignor of one-half to Alexander I. Martin, New York, N. Y.

Application March 13, 1946, Serial No. 654,022

10 Claims. (Cl. 225—21)

The present invention relates to an apparatus and method adapted to automatically prepare and dispense mixed drinks.

Most previous machines and devices used in connection with automatic dispensing of drinks have been ponderous, weighty, and complicated affairs that proved unsatisfactory for these and other reasons. Many previous attempts to produce a satisfactory apparatus resulted in devices which were not automatic in that they required manual operation of levers or shafts to perform certain steps, rather than accomplishing the complete operation by merely the insertion of a coin into a slot and removal of a fully prepared drink. Many previous attempts never progressed beyond preliminary design stages. Due to their complicated nature very few of such machines were ever adopted for actual commercial exploitation.

The present invention aims to provide a relatively simple apparatus and an improved method for automatically preparing and dispensing a mixed drink upon insertion of the necessary coin into a slot of the machine. Each time an additional coin is inserted another fully prepared drink is automatically delivered.

An object of the present invention is to provide a new and improved apparatus or machine for automatically dispensing a drink.

Another object of the present invention is to provide a new and improved method of making a mixed drink.

Another object of the present invention is to provide new and improved means for facilitating mixing together the components of a drink.

Another object of the present invention is to provide new and improved means or mechanism for achieving mixing of the components and delivery thereof at proper times.

Still another object of the present invention is to provide a drink dispensing apparatus having an improved cup dispensing means.

A further object of the present invention is to provide an improved means adapted to prevent insertion of a coin into the machine while it is in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

Fig. 1 is a diagrammatic representation showing the present apparatus;

Fig. 2 is a combination sectional and diagrammatic view illustrating the construction and operation of the fluid controlling means;

Fig. 3 is a sectional view of a mixing device;

Fig. 4 is a sectional view taken along the line 4—4 of Fig. 3;

Fig. 5 is a view showing preferred cam outlines;

Fig. 6 illustrates a timing diagram for the valves shown in Fig. 5;

Fig. 7 is a fragmentary sectional view showing a cup controlling mechanism;

Fig. 8 is an enlarged perspective view of a part shown in Fig. 7;

Fig. 9 is an elevational view illustrating a cup guiding means; and

Fig. 10 is a view illustrating a mixing diagram for the preferred embodiment and for a modified form of the invention.

Referring more particularly to Fig. 1 of the drawings there is shown a diagrammatic or schematic representation illustrating the present apparatus. The apparatus will be hereinafter described in connection with preparing a drink comprising a mixture of carbonated water and syrup. It will be understood that the invention is not limited to the combination of carbonated water and syrup but that the apparatus and method are adaptable to mix and dispense drinks containing other components.

Described generally, water from a water system and carbon dioxide from a gas system are led into a receiver 2 called a carbonator where they are mixed together to form carbonated water; from the carbonator 2 the carbonated water is conducted to a fluid controlling mechanism 4, which regulates the flow of carbonated water both to and from a receptacle or measuring cylinder 5. This fluid controlling mechanism 4 also controls the flow of syrup from a syrup reservoir 7 to a syrup measuring cylinder 8 and syrup from the measuring cylinder 8 to an outlet spout 10, where it flows into a cup or vessel 11 delivered by a cup dispensing mechanism 13 and mixes with carbonated water from the measuring cylinder 5. Actuation of the fluid controlling mechanism 4 and the cup dispensing mechanism 13 may be performed by the same electric motor 14.

The water system is shown at the left side of Fig. 1 and preferably comprises a stainless steel tank 16 having a cover 17 and connected by flexible hose 19 to a pump 20, a second hose or length of tubing 22 connecting the outlet side of the pump with the inlet side of a water purifier or filter 23. Water tank 16 is replenished with water from time to time by hand filling operations and may be cut off when desired by a stopcock 25. The purifier or filter 23 is not necessary where an adequate supply of pure water is readily available and in such instances may be entirely omitted from the water system. The outlet side of the water purifier shown in Fig. 1 is connected by a suitable length of tubing or flexible hose 26 with appropriate refrigerating or cooling coils 27 which may be maintained at desired temperature by ice, Dry Ice, or a suitable refrigerating or cooling unit (not shown). The outlet side of the cooling coils is connected through a check valve 28 with the receiver or carbonator 2 previously referred to where the water is adapted to be mixed with and to absorb carbon dioxide gas fed into the carbonator under pressure. The carbonator 2 thus provides carbonated water that may later be mixed with syrup to form a drink.

The carbon dioxide reaches the carbonator from a gas cylinder 29 by way of a conduit 31, pressure regulator 32 connected with a pressure indicating gauge 34, conduit 35 and check valve 36.

The carbonator 2, shown in more detail in Figs. 3 and 4, is adapted to receive water through the inlet 37 shown at the left side thereof and to receive carbon dioxide gas through the inlet 38 shown at the right side thereof. These incoming fluids strike or impinge against a baffle 40, churn or mix together around the edges 41 and 42 of the baffle and along its sides and flow upwardly into the pipe or conduit 43. As the liquid and gas proceed upwardly through the pipe the turbulence is considerable and as a result they are thoroughly mixed and a large portion of the gas is absorbed by the liquid. At the upper end of the conduit these two fluids pass into a chamber 44 and from thence flow outwardly through a fine screen 46 and a concentric coarser screen 47, as well as upwardly through perforations in a cover 49 having jagged downwardly projecting edges 50. The passage of the fluids through the screens 46 and 47 and through the perforations with the jagged edges 50 still further intermixes the fluids to obtain maximum absorption of the gas by the water. An outlet 51 from the carbonator 2 connects with a conduit 52 for conveying the intermixed and absorbed fluids to the fluid controlling mechanism 4, which controls the egress of carbonated water from the carbonator 2, and also subsequent flow of carbonated water and syrup into the cup 11 which has been delivered to a position beneath the outlet spout 10.

A nipple 53 secured to the upper part of the carbonator 2 is connected by conduits 55 and 56 with a pressure gauge 57 and a pressure actuated switch 58, the latter switch being in turn electrically connected with an electric motor that drives the water pump 20 of the water system so that it may be effective to control the operation thereof. The pump motor control switch 58 is preferably a commercially available maximum-minimum type and may be set or calibrated to cut in or start the pump 20 when the pressure in the carbonator 2 drops to a minimum of about seventy pounds per square inch and to cut out or stop the pump 20 when the pressure in the carbonator reaches a maximum of about one hundred and twenty-five pounds per square inch. The pressure regulator 32 connected with the carbon dioxide cylinder 29 may be adjusted so as to deliver gas at a pressure of approximately eighty-five to ninety pounds per square inch. It will be understood that the particular pressures referred to throughout the description are illustrative and that other appropriate pressures may be utilized; for example, the pump motor control switch could be set at more than one hundred and twenty-five pounds per square inch.

In the operation of the apparatus during dispensing of a drink the mechanism is preferably so adjusted that the level of the carbonated water in the carbonator 2 does not rise substantially above some such level as that indicated at $h$ in Fig. 3 and such that it does not fall below the level indicated at $l$ in this same figure. The volumetric difference between these two levels represents the quantity of liquid removed from the carbonator 2 and transferred to the carbonated water measuring cylinder 5 for the preparation of a drink; this quantity is preferably normally about five fluid ounces.

When the mechanism of the fluid controlling means 4 causes egress of carbonated water from the carbonator 2 through the conduit 52 and the fluid level in the carbonator drops from $h$ to $l$, the pressure therein drops rapidly from about one hundred and twenty-five pounds per square inch to approximately seventy pounds per square inch. This pressure drop causes closing of the contacts of the pump motor control switch 58 and the latter is effective to start the motor which drives the pump 20. The pump 20 sends water through the water system and into the left side of the carbonator 2. At about the same time that the water commences to flow into the carbonator, carbon dioxide from the cylinder 29 will also commence to flow therein, the two fluids impinging against the baffle 40 and flowing upwardly into the carbonator as previously described From the low level $l$ the liquid rises to the higher level $h$; each fall in level transfers about five fluid ounces through the pipe 52 and fluid controlling means 4 to the carbonated water receiving and measuring cylinder 5 where the carbonated water is stored under a pressure of about one hundred and twenty-five pounds per square inch until removed therefrom for the preparation of a drink.

The pump 20 is of a commercially available type and one manufactured by the Tutthill Pump Company driven by a one-quarter horsepower motor has proven satisfactory. As pointed out above the water tank 16 should be refilled from time to time and the carbon dioxide cylinder 29 must be renewed by a fresh cylinder when emptied. One tank of gas may deliver sufficient gas to mix two thousand drinks.

The fluid controlling means 4 through which the carbonated water passes is part of the mechanism for controlling the flow of the several fluids used in the present apparatus. It and its operation may be understood generally from schematic Fig. 1, and these are shown in greater detail in Figs. 2, 5 and 6. In order to simplify the description it may be helpful to state generally at this point that this fluid controlling means does the following things, but not necessarily limited to the order in which listed below:

1. Connects the carbonated water outlet line 52 from the carbonator 2 with the receiving and measuring cylinder 5 to supply it with charged or carbonated water by a conduit 63.

2. Connects the syrup tank reservoir 7 with the syrup measuring cylinder 8 to measure out a quantity of syrup.

3. Relieves the pressure in the receiving and measuring cylinder 5 by a conduit 61 and vents the pressure to the atmosphere at appropriate intervals through nipple 62 and suitable conduit.

4. Connects the outlet conduit 63 from the receiving and measuring cylinder 5 with cup filling conduit and spout 10.

5. Connects the syrup measuring cylinder 8 with cup filling spout 10.

As shown in Fig. 2 the fluid controlling means 4 comprises a housing 65 provided with various internal passageways or ports for conveying fluids and containing valves adapted to open and close the passageways to thereby control the passage of fluids through them. The valves themselves are actuated by cams A through E mounted at spaced intervals along a rotatable shaft 67. A cam A lifts a pressure relief and venting valve 68, the cam B lifts a carbonated water filling valve 69, the valve C lifts a syrup filling valve 70, the cam D lifts a syrup pouring valve 71 and the cam E lifts a carbonated water pouring valve 72. Each of these valves and the means for opening and closing it is generally similar to the other valves and their operating means and a description of one will suffice for all.

Adjacent the upper part of the housing 65 are shown chambers or recesses 73 having annular upwardly extending ridges or seats 75 adjacent their bottoms and connected by openings 76 with recesses 77 located at the lower part of the housing. A valve body in a chamber 73 carries at the lower part thereof an inset annular seat or insert preferably made of rubber, neoprene, plastic or other suitable material adapted to rest against the annular ring or seat 75. A valve is urged downwardly against a seat 75 by a spring 78 resting in a recess 79 of the valve, a screw plug 80 threaded into the recess 73 of the housing 65 retaining the spring in position.

Each valve is shown provided with fluting or fins 82 spaced at intervals around its periphery to thereby form passageways through which fluid may pass when the valve is lifted from its seat. Lifting of a valve is effected by a stem 83 likewise provided with fins or fluting 84 and cut away in the vicinity of the central portion thereof to thereby permit free passage of fluid axially along the stem. The upper end of each of these stems rests against the bottom of one of the valves 68 through 72 and the lower end of the stem rests, in each instance, against a flexible diaphragm 85 which is preferably clamped in position between a seat in the recess 77 and a seat on a bottom plug 86 threaded into a recess 77. The diaphragm is caused to flex upwardly or downwardly to lift or lower a stem 83 by push rods 87 which have enlarged heads 88 molded or imbedded into the diaphragm. In order to more firmly clamp a diaphragm in position it is preferably provided with an imbedded annular metal ring 89 that is gripped between the seats of the recess 77 and bottom plug 86. Movement of the push rod to flex the diaphragm 85 is preferably achieved by one of the cams A to E through the intermediation of a roller 91 carried by a plate or arm 92 pivotally secured to the shaft 93. The positioning of the roller 91 and the arm 92 between a cam and push rod 87 minimizes any tendency to twist or bend the push rod, as might be true if the cam pressed directly against the push rod.

When a valve is in closed position against a seat 75 there is no passage of fluid. When the valve is lifted from its seat fluid may flow into the chamber 73 around the valve, downwardly between the outwardly extending fins or ribs 82, beneath the valve, and into the passageway 76, downwardly past the fins or ribs 84 on the stem 83, past the cutaway area 83 of the stem, and outwardly through any suitable connecting passageway.

The valves and other mechanisms of the present drink dispensing apparatus are preferably so arranged and operated that one complete revolution of the camshaft 67 effects delivery of a single drink into a cup 11 released from one of the stacks of the cup dispensing means 13 and delivered into position beneath the spout 10. The camshaft 67 itself is rotated by an electric motor 14 (Figs. 1 and 7) through the intermediation of a speed reducing mechanism 94; it has been found that a commercially available combination of motor and speed reducer having a reduction ratio of 561 to 1 is effective. When a coin is inserted into the machine the motor 14 is caused to rotate the camshaft 67. The details of the mechanisms and wiring diagram whereby the motor is started will be later described.

As shown in the preferred embodiment, the first step effected upon rotation of the shaft 67 is for a cam A to lift the valve 68; lifting of this valve is effective to relieve the pressure in the carbonated water measuring cylinder 5 which connects with a port 95 in the housing 65 through a conduit 61 indicated by dotted lines in Fig. 2. The pressure in the cylinder 5 is vented to the atmosphere through the outlet port shown at the left side of Fig. 2. Very shortly subsequent to the lifting of the valve 68 to vent the pressure in the cylinder 5, the cam E lifts the valve 72 and allows the liquid level of carbonated water in the measuring cylinder 5 to flow from the carbonator down past the ribs or fins of the valve 72 and stem 83 into the passageway 98 and through the outlet spout 10 into a cup 11; this liquid flows out by gravity. Venting or relieving of the approximately one hundred and twenty-five pounds per square inch pressure from the cylinder 5 allows absorbed carbon dioxide gas to escape from the liquid and thus the liquid in a cup 11 will effervesce to a high degree. Both the vent opening valve A and the carbonated water pouring valve E continue to remain open during this time and shortly after carbonated water has commenced to emerge from the outlet spout 10, the syrup pouring cam D next lifts the valve 71 to cause syrup to flow out of the syrup measuring cylinder 8, past the fins of the valve 71 and its stem into the passage 98, and out of the outlet spout 10 into the cup 11; this valve remains open long enough for the cylinder 8 to empty and then it closes. The valves A and E continue to remain open for a substantial interval subsequent to the closing of the syrup pouring cam D and hence clear carbonated water continues to emerge from the outlet spout 10 after the cutting off of the syrup. This washes out any vestiges of syrup from the passage 98 and spout 10. The carbonated water pouring cam E and the vent opening cam A hold their corresponding valves open for a distance of approximately 36½° after the closing of the syrup pouring cam D and valve 71.

The cams A and E now close and approximately 2° further along in the revolution of the shaft 67 both the syrup filling cam C and the carbonated water filling cam B open their respective valves 70 and 69. The opening of the valve 70 permits syrup to run from the syrup reservoir or tank 7 through a conduit 100, downwardly past the valve 70, through a passageway 102 and upwardly into the syrup measuring cylinder 8. This syrup measuring cylinder 8 is designed to contain approximately one and one-sixteenth fluid ounces of syrup in its lower portion of large diameter. The small diameter tube extending upwardly from the top thereof permits the level in the syrup measuring cylinder to equalize with the level in the syrup reservoir 7 without adding materially to the fluid content of the measuring cylinder. Lifting of the valve 69 by the cam B connects the conduit 52 (Fig. 1) with the carbonated water measuring cylinder 5 so that pressure in the carbonator 2 may force carbonated water through the passage 103, downwardly past the ribs of the valve 69 and its stem, through a passageway 104 in the housing and through line 63 into the carbonated water measuring cylinder 5. The cams C and B remain open for approximately 106°, which is sufficient to allow replenishment of the syrup measuring and carbonated water measuring cylinders; these two cams then close their valves 70 and 69.

At this point in the operation all of the valves in the housing 65 are closed against their respective seats due to the fact that the various cams on the shaft 67 have moved out of contact with the push rods of these various valves. The apparatus is thus in position to commerce another cycle, which would be started by the insertion of another coin into the coin slot of the mechanism.

The timing diagram of Fig. 6 illustrates a preferred operation of the various cams and the opening and closing of the valves controlled by them. The tapered end on the syrup pouring cam indication shows that this cam D closes slowly due to the shape of the exterior surface of this cam. The other cams open and close quickly as indicated by the abrupt termination of their indications.

The steps of first commencing the flow of clear carbonated water, secondly starting the flow of syrup, next terminating the flow of syrup, and finally cutting off the flow of clear carbonated water subsequent to the closing of the syrup pouring valve are highly desirable for with this method carbonated water washes out of the various ports, passageways, and conduits any vestiges of syrup. This is highly desirable for if the syrup is allowed to remain during an interval between drinks it tends to dry and form a solidified or thick, sticky mass which is unsanitary and "gums up" the operation of the machine and interferes with its successful functioning. One viewing the outlet spout 10 should, therefore, first see clear fluid emerge from it, then the colored drink due to the addition of syrup, and finally should see the clear liquid again emerge from the spout.

The release of the carbonated water into the cup immediately subsequent to relieving the pressure under which it has been stored permits small bubbles to form and emerge from the liquid. Thus a drink formed in the cup bubbles relatively boisterously and gives the appearance of freshness rather than one of flatness or staleness. This is important from a sales standpoint. If the pressure were not relieved prior to running the carbonated water into a cup, the water would be forced out in a spray or with a geyser-like effect and the absorbed carbon dioxide gas largely expended directly to the atmosphere; the liquid reaching the cup would then be flat or stale since the gas had already been released from it.

The cup supplying mechanism is driven by the same motor 14 and speed reducer 94 that actuates camshaft 67. It will be noted that a short shaft 106 which is effective to rotate the camshaft 67 is connected by suitable gear mechanism with a second shaft 107 carrying spaced cams or arms 108 adapted to effect release of cups or receptacles from stacks or dispensers 109. The cup dispensers 109 may be mounted in a straight line and each of them may be the commercially available type 77G for dispensing Lily-Tulip cups. This type of cup dispenser has a release plunger 110 extending outwardly from the base thereof and a single cup is released by pushing a plunger inwardly and releasing it. Each of the arms or cams 108 spaced along the shaft 107 and adapted to press inwardly against a plunger 110 to release a cup is secured to the shaft 107 in offset relation with respect to the other arms, so that only one arm will press inwardly at a time against a cup releasing plunger.

Preferably the cup shaft 107 is so connected that it makes one-quarter of a revolution for each complete revolution of the drive shaft 106; since the arms 107 are each off-set 90° this means that one cup will be released per revolution of the camshaft 67 which actuates the fluid controlling means 4. One form of mechanism for achieving intermittent turning of the shaft 107 through one-quarter of a revolution per single revolution of the shaft 106 is illustrated in Fig. 8. As shown, each time the toothed segment of the gear 112 meshes with the teeth of the adjacent gear 113 the latter gear will be rotated through one-quarter of a revolution. Limitation to no more than one-quarter of a revolution is achieved by the circular cooperating plate 114 and rectangular plate 115. As the toothed segment of gear 112 moves into mesh with the teeth of gear 113, the gear 113 will commence to rotate and an outwardly extending corner 116 will move downwardly into the cut out portion 117 of the circular plate 114. As the toothed segment approaches the end of its travel a flat side 119 of the rectangular plate 115 will be in position to permit passage of the flat plate 114 beneath it. The cooperation of the cutaway circular plate and the substantially rectangular plate permits rotation of the shaft 107 during such time as the teeth of the two gears are in mesh with each other, but the flat side on the rectangular plate prevents accidental or undesirable rotation of the shaft 107 when the teeth are out of engagement. This insures release of only a single cup at a time from the cup mechanism. Preferably the cams or arms 108 do not press directly against the cup releasing plungers 110 but against pivotally mounted plates 120 to thereby minimize the possibility of bending or twisting the cup releasing plungers out of line.

After being released from one of the cup dispensers 109 a cup is preferably guided into position beneath the outlet spout 10 by a chute or guide 122 (Fig. 9). This guiding means receives cups from any one of the dispenser extensions 123, conveys it downwardly and delivers it in upright position beneath the spout. The cup delivery mechanism is so adjusted that a cup is in position beneath the spout before any liquids issue from the spout.

A suitable wiring diagram for the preferred embodiment is illustrated at the left side of the dotdash line 125—125 of Fig. 10 and its operation will now be described.

When a coin is inserted into the coin chute 126 it contacts and moves the pivoted lever 127, which in turn is operative to momentarily close the contacts within a microswitch 128. Closing the microswitch contacts allows current to flow, for example, from main line 133, through the wire 129, center leaf 130 and upper leaf 131 of the switch 132, wire 134, microswitch 128, wire 135, and solenoid 137, into the turn wire 138 and main line 141. The energizing of the solenoid 137 is effective to close the contacts 142, 143, 144 and 145 of the relay 146. Closing the relay contacts 144 and 145 energizes the solenoid 148, which thereupon moves a bar 149 across the entrance opening to the coin chute 126 in opposition to a spring 150, and thereby prevents insertion of a second coin into the machine during such time as the machine is operating. The closing of the relay 146 is also effective to admit current to the field coils of the motor 152 and it commences to rotate and turn the cam shaft 67 of the fluid controlling means 4 and the cam shaft 107 which effects release of a cup from a cup dispenser 13.

The general operation may be summarized by stating that the microswitch 128 closes momentarily and thereby brings about closing of the contacts of the relay 146, which in turn cuts out or by-passes the microswitch 128; the coin bar 149 is actuated, and the motor 152 commences to revolve and thereby turns the cam shafts 67 and 107. All of these steps occur practically simultaneously. Rotation of the motor 152 also turns the cam 153 that is effective to open the contacts 154 and 155 of the switch 132 and to close the bottom two contacts 156 and 157 thereof; this is effective to cause opening of the relay 146 and to close the contacts 159 and 160 which were opened when the relay initially closed. Closing the contacts 159 and 160 cuts in the resistance 161, of about 400 ohms, without deenergizing the solenoid 148 of the coin bar or stopping the motor. The resistance 161 brakes the motor 152. When the cam 153 has rotated sufficiently far for the flexible arm 163 to snap into the low area thereof the solenoid 148 of the coin bar is de-energized due to closing the upper two contacts 154 and 155 of the switch 132, the motor 152 stops and the mechanism is in position to receive another coin and deliver another drink.

Preferably the refrigerating or cooling device 164 for maintaining a reduced temperature at the water coils 27 (Fig. 1) is connected directly across the lines 133—141 through a temperature controlling switch 115 so that this temperature is maintained at all times. Also, the water pump control switch 58 may be connected across the lines 133—141 to maintain a correct desired pressure in the carbonator 2 so that the apparatus will be ready to function at any time.

At the right side of Fig. 10 there is shown a modified form of the invention wherein actuation of the valves of the fluid controlling means 4 and delivery of cups is achieved electrically by means of solenoids. As the shaft 67a is rotated by the motor 152 the cams 167 close the contacts in desired order to energize the solenoids 168 and move the push rods 87a that lift the valves. The shaft 67a is connected by gears 169 and 170 with the camshaft 107a for effecting release of cups from dispensers 109a upon closing of contacts to energize solenoids 171. For example, as a cam 167 closes the contacts 172—173 current will flow along the wire 174 through the closed contacts, along the wire 175, through a solenoid 168, to move a rod 169 upwardly and lift a push rod 87a and a fluid controlling valve in the housing 4a. Current from the other side of the solenoid 168 flows back to the return line 141 through the wire 176. Preferably the gear 169 has one-quarter as many teeth as the gear 170; for example, the small gear may have fifteen teeth and the large gear may have sixty teeth to thereby provide one-quarter a revolution for cup shaft 107a per single revolution of the camshaft 67a. The purpose of this is to cause release of only a single cup for each complete revolution of a camshaft 67a. As the cam 108a closes contacts 177 and 178 current may flow to a cup solenoid 171 through wire 179 and 180 and out of the solenoid through the wire 181. Energizing of a solenoid 171 moves the pivoted lever 182 and presses inwardly against a push rod 110a to release a cup. The cup may be guided into position beneath an outlet spout by a chute similar to that described in connection with the preferred embodiment.

It will be seen that the present invention provides a new and improved apparatus and method for dispensing mixed drinks of the carbonated water-syrup type. Introducing water and gas into a carbonator from opposite sides thereof so that they impinge against a baffle, and thereafter conducting them into a mixing chamber where they are forced through fine and coarse screens, effects a high degree of turbulence and absorption of gas into the water.

Causing the syrup to flow during an interval intermediate the starting and stopping of the flow of carbonated water insures eliminating or minimizing deposits of viscous syrup that may later solidify and hinder the operation of the machine or bring about unsanitary conditions. Releasing the pressure on the carbonated water immediately prior to its entrance into a cup insures release of imprisoned gas from the water while in the cup. The combination of clean, uncontaminated syrup and fresh intensely bubbling carbonated water in a cup insures an appealing salable drink; these two features are highly important from a sales standpoint.

The plurality of cup dispensers and cooperating means for guiding cups into position beneath an outlet spout cuts down on the frequency of servicing units for replenishment of cups. The coin arrestor prevents entry of a second coin into the machine at such time as it is already in operation due to the insertion of a first coin. The various parts of the combination are relatively simple and sturdy and require little or no attention and servicing. The apparatus is rugged in construction and capable of remaining in satisfactory operating condition over long periods of time.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In a device of the class described, a device for intermixing water and a gas comprising, a receiver, converging conduits connected with said receiver and terminating adjacent different surfaces of a baffle for conveying separate streams of water and gas to the receiver and discharging them at different surfaces of said baffle, a baffle located substantially at the point of convergence of said streams of water and gas, and a screen within said receiver adapted to intermix said water and gas upon passage therethrough into the receiver.

2. In a device of the class described, a device for intermixing water and a gas comprising, a receiver, a plurality of inlet conduits connected with said receiver and converging toward a single point for conveying separate streams of water and gas to said single point of the receiver, a stream-separating baffle located substantially at the single point toward which said streams of water and gas converge, and a plurality of spaced screens connected with said water and gas inlets adjacent said point of stream convergence and within said receiver adapted to intermix said water and gas upon passage therethrough into the receiver.

3. In a device of the class described, a device for intermixing water and a gas comprising, a receiver, inlet conduits connected with said receiver and converging toward one location for conveying separate streams of water and gas to the receiver, a baffle located substantially at the one location toward which said streams of water and gas converge, a plurality of spaced concentric screens within said receiver, and a conduit connecting said screens with the water and gas inlets adjacent said one location and said baffle, said baffle and screens being adapted to effect turbulence and intermixing of said water and gas upon passage to and into the receiver.

4. In a drink dispensing apparatus, means adapted to receive separate streams of liquid and gas and to effect intermixing of them to produce an effervescible liquid, a receptacle for storing said effervescible liquid under pressure for subsequent venting thereof to atmosphere, a conduit adapted to convey effervescible liquid from the intermixing means to the receptacle, a venting conduit connected with the upper part of the receptacle for relieving pressure from said receptacle, a syrup container, additional conduits adapted to convey effervescible liquid from the receptacle and syrup from the syrup container to a discharge pipe, and flow controlling means including valves operatively connected with said venting conduit and additional conduits for coordinating the flow of liquids from said receptacle and syrup container to said discharge pipe and for relieving to atmosphere pressure in said receptacle prior to flow of said liquids from said discharge pipe.

5. In a drink dispensing apparatus, the combination of means adapted to intermix liquid and gas and to produce an effervescible liquid, a pressure reducing chamber for storing said effervescible liquid under pressure for subsequent venting to atmosphere, a conduit adapted to convey effervescible liquid from the intermixing means to the reducing chamber, a venting conduit connected with the reducing chamber for relieving pressure therefrom to atmosphere, a syrup container, additional conduits adapted to convey effervescible liquid from the reducing chamber and syrup from the syrup container to a discharge pipe, and flow controlling means comprising valves in said venting and additional conduits for coordinating the flow of liquids therethrough and for relieving to atmosphere pressure in said reducing chamber prior to flow of effervescible liquid from said discharge pipe.

6. A device as claimed in claim 5, in which there is provided a block-like housing, portions of said venting and additional conduits are formed in said housing, and said valves are disposed in a row in said housing.

7. A device as claimed in claim 5, in which each of said valves is provided with at least a single peripherally disposed recess through which fluid may pass when the valve is in an open position.

8. A device as claimed in claim 5, in which there is provided a blocklike housing having a row of openings therethrough, said venting and additional conduits include portions of said openings, inwardly projecting shoulders form valve seats intermediate ends of said openings, said valves are adapted to rest against said seats, a spring is provided for urging each valve toward its seat, each of said openings contain reciprocable valve operating means, and means is provided for moving said reciprocable means in opposition to said springs to thereby move the valves off their seats.

9. A device as claimed in claim 5, in which said syrup container includes an open-ended tube of small diameter in communication with and extending upwardly therefrom for facilitating accurate measurement of syrup charges.

10. A device as claimed in claim 5, in which said flow control means includes a camshaft for operating said valves, a plurality of similarly oriented plunger-operated cup dispensers is arranged in a row above and adjacent said discharge pipe, a camshaft extends along said dispensers adjacent the plungers thereof with a cam corresponding to each plunger for operating it to release cups, said cams being so offset with respect to each other that only one at a time operates a plunger and releases a cup, guide means extends from said cup dispensers to a location adjacent said discharge pipe for guiding cups thereto, and said camshafts are operatively interconnected with each other for driving from a single motor.

HANS G. NISSEN.

REFERENCES CITED

The following references are of record in the file of this patent:

UNITED STATES PATENTS

| Number | Name | Date |
|---|---|---|
| 2,019,016 | McLellan | Oct. 28, 1935 |
| 2,096,522 | Lambert | Oct. 19, 1937 |
| 2,149,670 | Fetterly | Mar. 7, 1939 |
| 2,249,236 | Tratsch | July 15, 1941 |
| 2,256,976 | Ford | Sept. 23, 1941 |
| 2,333,665 | Mills | Nov. 9, 1943 |
| 2,346,290 | Carlson | Apr. 11, 1944 |
| 2,374,168 | Bowman | Apr. 24, 1945 |
| 2,376,403 | Thompson et al. | May 22, 1945 |
| 2,391,003 | Bowman | Dec. 18, 1945 |
| 2,401,914 | Di Petro | June 11, 1946 |
| 2,415,571 | Yuza | Feb. 11, 1947 |
| 2,426,707 | Polsen et al. | Sept. 2, 1947 |
| 2,475,511 | Nicholson | July 5, 1949 |